US012620724B2

(12) United States Patent
Acar et al.

(10) Patent No.: US 12,620,724 B2
(45) Date of Patent: May 5, 2026

(54) PHASED-ARRAY ANTENNA SYSTEM

(71) Applicant: NXP B.V., Eindhoven (NL)

(72) Inventors: Mustafa Acar, Eindhoven (NL); Lucas Maria Florentinus De Maaijer, Venlo (NL); Paul Mattheijssen, Boxtel (NL)

(73) Assignee: NXP B.V., Eindhoven (NL)

( * ) Notice: Subject to any disclaimer, the term of this patent is extended or adjusted under 35 U.S.C. 154(b) by 667 days.

(21) Appl. No.: 18/161,315

(22) Filed: Jan. 30, 2023

(65) Prior Publication Data

US 2023/0268667 A1 Aug. 24, 2023

(30) Foreign Application Priority Data

Feb. 23, 2022 (EP) .................................... 22158163

(51) Int. Cl.
*H01Q 21/06* (2006.01)
*H01Q 3/24* (2006.01)
*H01Q 21/08* (2006.01)

(52) U.S. Cl.
CPC ........... *H01Q 21/065* (2013.01); *H01Q 3/247* (2013.01); *H01Q 21/08* (2013.01)

(58) Field of Classification Search
CPC ....... H01Q 21/065; H01Q 21/08; H01Q 3/247
See application file for complete search history.

(56) References Cited

U.S. PATENT DOCUMENTS

2019/0089434 A1* 3/2019 Rainish .................. H04B 7/086
2021/0159594 A1* 5/2021 Tiebout .................. H01Q 5/385
2022/0166138 A1* 5/2022 Eshrah ..................... H01Q 3/26
2022/0271425 A1* 8/2022 Kilpatrick ............ H01Q 21/065
2024/0055765 A1* 2/2024 Sakr ..................... H01Q 21/065

OTHER PUBLICATIONS

Gu, X., "Packaging and Antenna Integration for Silicon-Based Millimeter-Wave Phased Arrays: 5G and Beyond", IEEE Journal of Microwaves, vol. 1, No. 1, Jan. 7, 2021.
Kibaroglu, K., "An Ultra Low-Cost 32-Element 28 GHz Phased-Array Transceiver with 41 dBm EIRP and 1.0-1.6 Gbps 16-QAM Link at 300 Meters", 2017 IEEE Radio Frequency Integrated Circuits Symposium (FRIC), Jun. 4-6, 2017.
Kibaroglu, K., "A Scalable 64-Element 28 GHz Phased-Array Transceiver with 50 dBm EIRP and 8-12 Gbps 5G Link at 300 Meters Without Any Calibration", 2018 IEEE/MTT-S International Microwave Symposium—IMS, Jun. 10-15, 2018.

* cited by examiner

*Primary Examiner* — Junpeng Chen

(57) ABSTRACT

A phased-array antenna system includes a substrate and a plurality of sub-arrays. Each sub-array comprises an array of patch antennas arranged on a first major surface of the substrate; a plurality of beamformer devices coupled to the array of patch antennas; a multi-channel up-down converter (UDC) and a combiner-splitter coupled to the multi-channel UDC. The combiner-splitter is configured to split a signal provided by the UDC and provide the signal to each of the plurality of beamformers and/or to combine signal provided by the plurality of beamformers and to provide the combined signal to the UDC. Each sub-array also includes an integrated device comprising the multi-channel UDC and the combiner-splitter. The integrated device and the plurality of beamformer devices is arranged on a second major surface of the substrate opposite the first major surface. The integrated device is arranged between at least two beamformer devices.

17 Claims, 6 Drawing Sheets

100

300

300

300

PHASED-ARRAY ANTENNA SYSTEM

CROSS-REFERENCE TO RELATED APPLICATIONS

This application claims the priority under 35 U.S.C. § 119 of European Patent application no. 22158163.0, filed on 23 Feb. 2022, the contents of which are incorporated by reference herein.

FIELD

The present disclosure relates to a phased-array antenna system and method of manufacturing a phased-array antenna system.

BACKGROUND

Mobile communications cellular networks such as networks supporting 4G or 5G mobile communications standards may use base transceiver stations (BTS) or base stations including phased-array antenna systems which support communications using beamforming techniques to improve the network capacity and coverage.

These antenna systems include an array of antennas, typically implemented as patch antennas arranged in a regular rectangular grid. The pitch or spacing of the patch antennas is determined by the wavelength of the communications frequency used in transmission or reception. The patch antennas may be dual-polarization antennas which have orthogonal polarization to improve antenna diversity and and/or channel throughput.

In operation, beamforming and/or beam-steering is used both in transmit mode to focus the direction of the transmitted radio frequency (RF) signal towards another BTS or a user equipment receiver (UE) for example a mobile phone and in receive mode to improve the sensitivity of a signal transmitted from a user equipment transmitter.

Beamforming requires multiple antennas to be operated in a transmit (TX) or receive (RX) mode. In transmit mode the phase and amplitude of the signal is adjusted for each of the relevant antenna to form the desired beam direction. In receive mode, the received signals from multiple antenna patches are combined using signal processing techniques to selectively receive signals from a desired beam direction and suppress unwanted signals.

SUMMARY

Various aspects of the disclosure are defined in the accompanying claims. In a first aspect there is provided a phased-array antenna system comprising: a substrate; a plurality of sub-arrays, each sub-array comprising: an array of patch antennas arranged on a first major surface of the substrate; a plurality of beamformer devices coupled to the array of patch antennas; a multi-channel up-down converter (UDC); a combiner-splitter coupled to the multi-channel UDC, the combiner-splitter being configured to split a signal provided by the UDC and provide the signal to each of the plurality of beamformers and/or to combine signal provided by the plurality of beamformers and to provide the combined signal to the UDC; an integrated device comprising the multi-channel UDC and the combiner-splitter; wherein the integrated device and the plurality of beamformer devices is arranged on a second major surface of the substrate opposite the first major surface and wherein the integrated device is arranged between at least two beamformer devices.

In one or more embodiments, the combiner-splitter may comprise a Wilkinson network.

In one or more embodiments, each sub-array may further comprise: an array of 16 patch antennas; 4 beamformer devices, each beamformer device comprising four channels, each channel coupled to a respective patch antenna; wherein the 4 beamformer devices are arranged in two rows each row having 2 beamformer devices; and wherein the integrated device is arranged between a first row and a second row of the 4 beamformer devices.

In one or more embodiments, each sub-array may further comprise: an array of 32 patch antennas; four beamformer devices, each beamformer device comprising four channels, each channel coupled to a respective pair of patch antennas; wherein the four beamformer devices are arranged in two rows each row having two beamformer devices; and wherein the integrated device is arranged between a first row of the two rows and a second row of the two rows.

The substrate may comprise a plurality of metal layers.

In one or more embodiments, the phased-array antenna system may further comprise a plurality of digital front-ends (DFEs) each digital front-end configured to provide a signal for each channel of the multi-channel UDC.

In one or more embodiments, each sub-array may further comprise: a first plurality of connections between the multi-channel UDC and the plurality of beamformers, the first plurality of connections comprising a first metal layer of the plurality of the metal layers; and a second plurality of connections between the plurality of beamformers and the array of patch antennas, the second plurality of connections comprising at least a second metal layer of the plurality of the metal layers.

In one or more embodiments, each sub-array may further comprise: a first plurality of connections between the multi-channel UDC and the plurality of beamformers, the first plurality of connections comprising a first metal layer of the plurality of the metal layers; and a second plurality of connections between the plurality of beamformers and the array of patch antennas, the second plurality of connections comprising at least a second metal layer of the plurality of the metal layers; and a third plurality of connections between the multi-channel UDC and the plurality of DFEs, the third plurality of connections comprising the first metal layer of the plurality of the metal layers.

In one or more embodiments, the phased-array antenna system may be configured as a millimeter wave antenna system.

In one or more embodiments, the phased-array antenna system may be configured as a multiple-input multiple-output (MIMO) antenna system for a mobile communication system.

One or more embodiments of the phased-array antenna system may be included in a radar system.

In a second aspect, there is provided a method of manufacturing a phased-array antenna system, the method comprising: providing a substrate; forming a plurality of sub-arrays, each sub-array comprising: a plurality of beamformer devices coupled to an array of patch antennas; a multi-channel up-down converter (UDC); a combiner-splitter coupled to the multi-channel UDC, the combiner-splitter being configured to split a signal provided by the UDC and provide the signal to each of the plurality of beamformers and/or to combine signal provided by the plurality of beamformers and to provide the combined signal to the UDC; an integrated device comprising the multi-channel UDC and the combiner; the method further comprising: forming an array of patch antennas on a first major surface of the substrate; and placing the integrated device and the plurality of beamformer devices on a second major surface of the substrate opposite the first major surface and wherein the integrated device is arranged between at least two beamformer devices.

In one or more embodiments, the combiner-splitter may comprise a Wilkinson network.

In one or more embodiments, each sub-array may further comprise: an array of sixteen patch antennas; four beamformer devices, each beamformer device comprising four channels, each channel coupled to a respective patch antenna; wherein the four beamformer devices arranged in two rows each row having 2 beamformer devices; and wherein the integrated device is arranged between a first row and a second row.

In one or more embodiments, each sub-array may further comprise: an array of thirty two patch antennas; four beamformer devices, each beamformer device comprising four channels, each channel coupled to a respective pair of patch antennas; wherein the four beamformer devices are arranged in two rows each row having two beamformer devices; and wherein the integrated device is arranged between the first row and the second row.

In one or more embodiments, the substrate comprises a plurality of metal layers.

In one or more embodiments, the method may further comprise providing a plurality of digital front-ends, DFEs, each digital front-end configured to provide a signal for each channel of the multi-channel UDC.

In one or more embodiments, the method may further comprise for each sub-array: forming a first plurality of connections between the multi-channel UDC and the plurality of beamformers, the first plurality of connections comprising a first metal layer of the plurality of the metal layers; and forming a second plurality of connections between the plurality of beamformers and the array of patch antennas, the second plurality of connections comprising a second metal layer of the plurality of the metal layers.

In one or more embodiments, the method may further comprise for each sub-array: forming a first plurality of connections between the multi-channel UDC and the plurality of beamformers, the first plurality of connections comprising a first metal layer of the plurality of the metal layers; and forming a second plurality of connections between the plurality of beamformers and the array of patch antennas, the second plurality of connections comprising a second metal layer of the plurality of the metal layers; and forming a third plurality of connections between the multi-channel UDC and the plurality of DFEs, the third plurality of connections comprising the first metal layer of the plurality of the metal layers.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
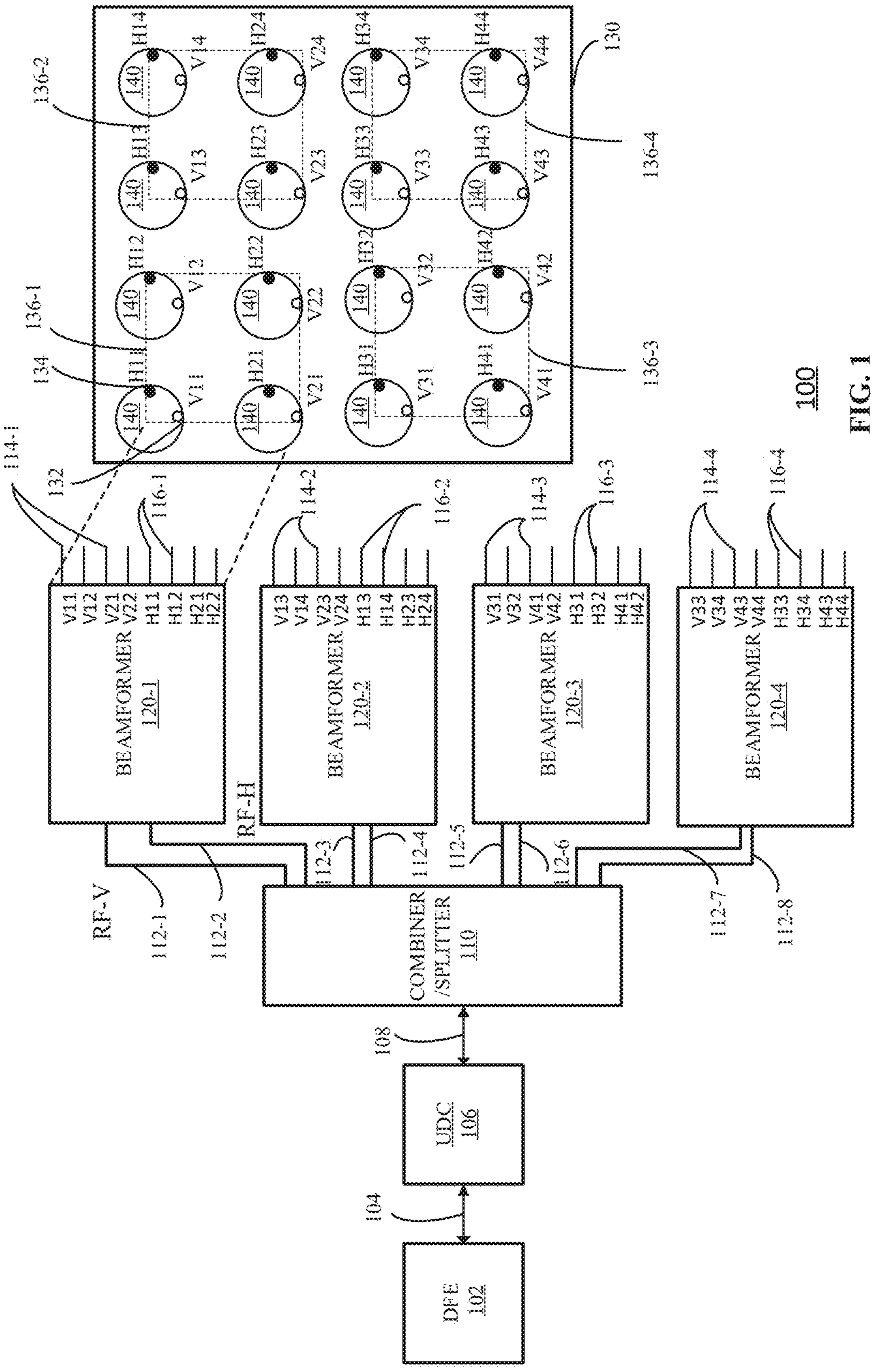
FIG. 1 shows an example phased-array antenna system.

FIG. 1 shows a phased-array antenna system 100 which may be a MIMO antenna system for mobile communication. The phased-array antenna system 100 includes a digital front-end (DFE) 102 connected by connection 104 to an up/down converter (UDC) 106. The UDC may be connected by connection 108 to a combiner-splitter 110 which may implemented as a Wilkinson network.

The connections 104 and 108 may be single connections or multiple connections, for example separate connections for in-phase (I) and quadrature (Q) IF passband signals. The connections 104, 108 may also have separate connections for RF-H and RF-V signals In other examples, the RF-H and RF-V signals may be time-multiplexed. The phased-array antenna system 100 may further include a number of beamformers 120-1, 120-2, 120-3, 120-4. Each beamformer is connected by a pair of respective connections, one for RF-H and one for RF-V. For example beamformer 120-1 is connected by connections 112-1 and 112-2 to the combiner-splitter 110. Similarly connections 112-3, to 112-8 connect the combiner-splitter 110 to each respective beamformer 120-2, 120-3, 120-4. When providing a signal for beamforming, the combiner-splitter 110 may split a signal received from the UDC 106 into separate signals provided via connections 112 to beamformer channels (not shown) in each beamformer 120-1, 120-2, 120-3, 120-4. Alternatively, when receiving a signal from the beamformer, the combiner-splitter 110 may combine multiple signals received from connections 112 and provide the combined signal to the UDC 106.

The antenna panel 130 consists of an array of dual-polarization antenna patches 140. A 4×4 array of patch antennas is illustrated but other example may have more patch antennas. An antenna patch 140 includes a first polarization feed-point 132 and second polarization feed-point 134. As illustrated the first polarization feed-point 132 is a vertical polarization feed-point and the second polarization feed-point 134 is a horizontal polarization feed-point. The terms horizontal and vertical polarization as used herein may be considered to refer to two mutually orthogonal polarization directions. The horizontal and vertical feed-points are denoted by Hij and Vij where i is the row number and j is the column number of each patch antenna 140 in the antenna panel 130. The orientation of the antenna patches 140 may be different than illustrated. The phased-array antenna system 100 may be configured to transmit or receive a number of beams for example 4 or 8 beams. The number of beamformers 120 is dependent on how many antenna patches 140 are used for each beam.

As illustrated, beamformer 120-1 includes four vertical polarization beamformer channels (not shown) with connections 114-1 denoted V11, V12, V21, V22 to corresponding feed points 132 of a respective one of the patch antennas 140 in an antenna section 136-1. Beamformer 120-1 includes four horizontal polarization beamformer channels (not shown) having connections 116-1 denoted H11, H12, H21, H22 to corresponding feed points 134 of a respective one of the patch antennas 140 in antenna section 136-1. Similarly beamformers 120-2, 120-3, 120-4 have horizontal and vertical polarization beamformer channels (not shown) similarly connected via respective connections 114-2, 114-3, 114-4, 116-2, 116-3, 116-4 to respective antenna sections 136-2, 136-3 and 136-4. As illustrated, 4 beamformers are required so one beamformer is connected to each of antenna-sections 136. In other examples, each beamformer may have fewer or more channels.

In operation the antenna system 100 may be configured to transmit a beamformed signal or to beamform a received signal. The beamformers 120 may be configured in a transmit or receive mode. In a transmit mode of operation a digital signal may be converted to an analog IF signal by DFE 102. The analog signals are up converted by UDC 106 and then split to provide the vertical polarization RF signal RF-V and the horizontal polarization RF signal RF-H for each beamformer 120. The RF-V and RF_H signals may then be output from the beamformer 120-1 as four vertical polarization RF signals connected to four polarization feed-points V11, V12, V21, V22 and four horizontal polarization RF signals connected to four polarization feed-points H11, H12, H21, H22. The beam-formed signal is transmitted from antenna section 136-1. Similarly, the other beamformer devices output signals to corresponding antenna sections 136-2, 136-3, 136-4 respectively. Four antenna sections are illustrated, but it will be appreciated that in general there may be an antenna section corresponding to each beamformer. The resulting beam is transmitted from the antenna sections 136-1, 136-2, 136-3, 136-4.

In a receive mode of operation, the beamformers 120-1, 120-2, 120-3, 120-4 may be configured to receive RF signals from the respective antenna section 136-1, 136-2, 136-3, 136-4 to preferentially receive a signal from a particular direction. The detected signals are then received via the beamformers and combined by the combiner-splitter 110. After down converting by the UDC 106, the resulting IF signals are converted to digital signals by DFE 102.

The phased-array antenna system 100 may operate in a time division duplex (TDD) mode of operation. During each time-slot, the phased-array antenna system 100 is configured to select to transmit and/or receive a number of beams. A beamformed signal is transmitted or a received signal is beamformed in a particular time slot.

Figure 2:
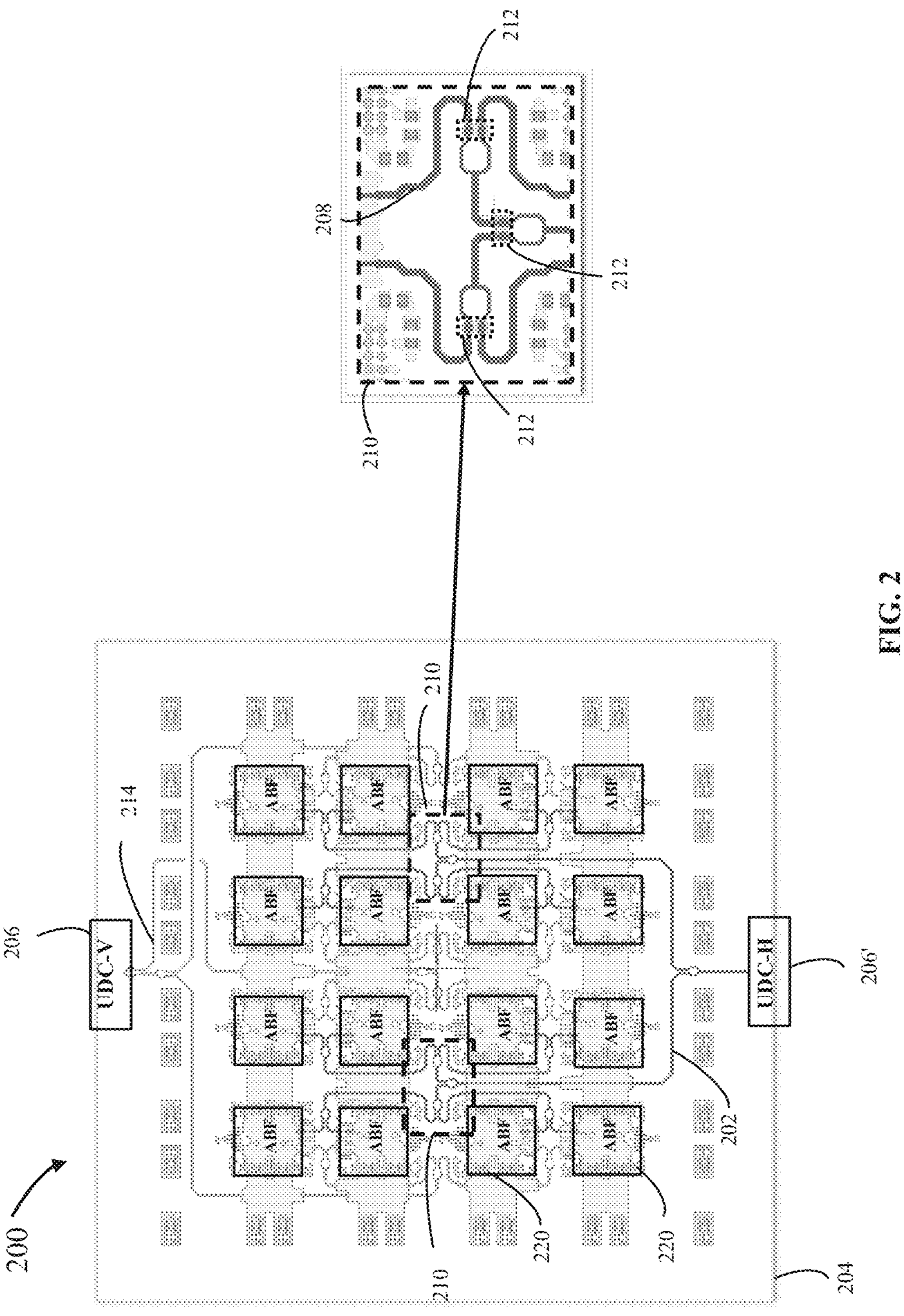
FIG. 2 illustrates an example placement of the components of an example phased-array antenna system.

FIG. 2 shows an example phased-array antenna system 200 similar to phased-array antenna system 100. The phased-array antenna system 200 includes a UDC which as illustrated is split into UDC-V 206 which supplies the vertical polarization signals from the top via connection 214 and UDC-H 206' which supplies the horizontal polarization signals from the bottom via connection 202. Phased-array antenna system 200 includes analogue beamformers 220 arranged on a substrate which may be a multi-layer printed circuit board (PCB) 204. The combiner-splitter 210 implements a Wilkinson network formed on the printed circuit board 204. The UDC 206 is connected to the analogue beamformer devices 220 via connections 202, 214. The UDC 206 is also connected to a digital front-end (not shown) similar to the phased-array antenna system 100. Each Wilkinson network 210 consists of stripline connections 208 and resistors 212. The resistors 212 are surface mount devices placed on the printed circuit board 204. In an example implementation a surface mount resistor may have dimensions of width 0.6 mm, length 0.3 mm and height of 0.25 mm The antennas (not shown) are also formed on the substrate 204. Increases in the frequency of operation decreases the array size and brings routing challenges to antenna panel printed circuit board design, since scaling down the surface mount device components and dies with the same ratio may not be easy in practice. Therefore, the space left for routing at antenna panels at higher frequencies for example millimeter-wave frequencies becomes more challenging.

Figure 3A:
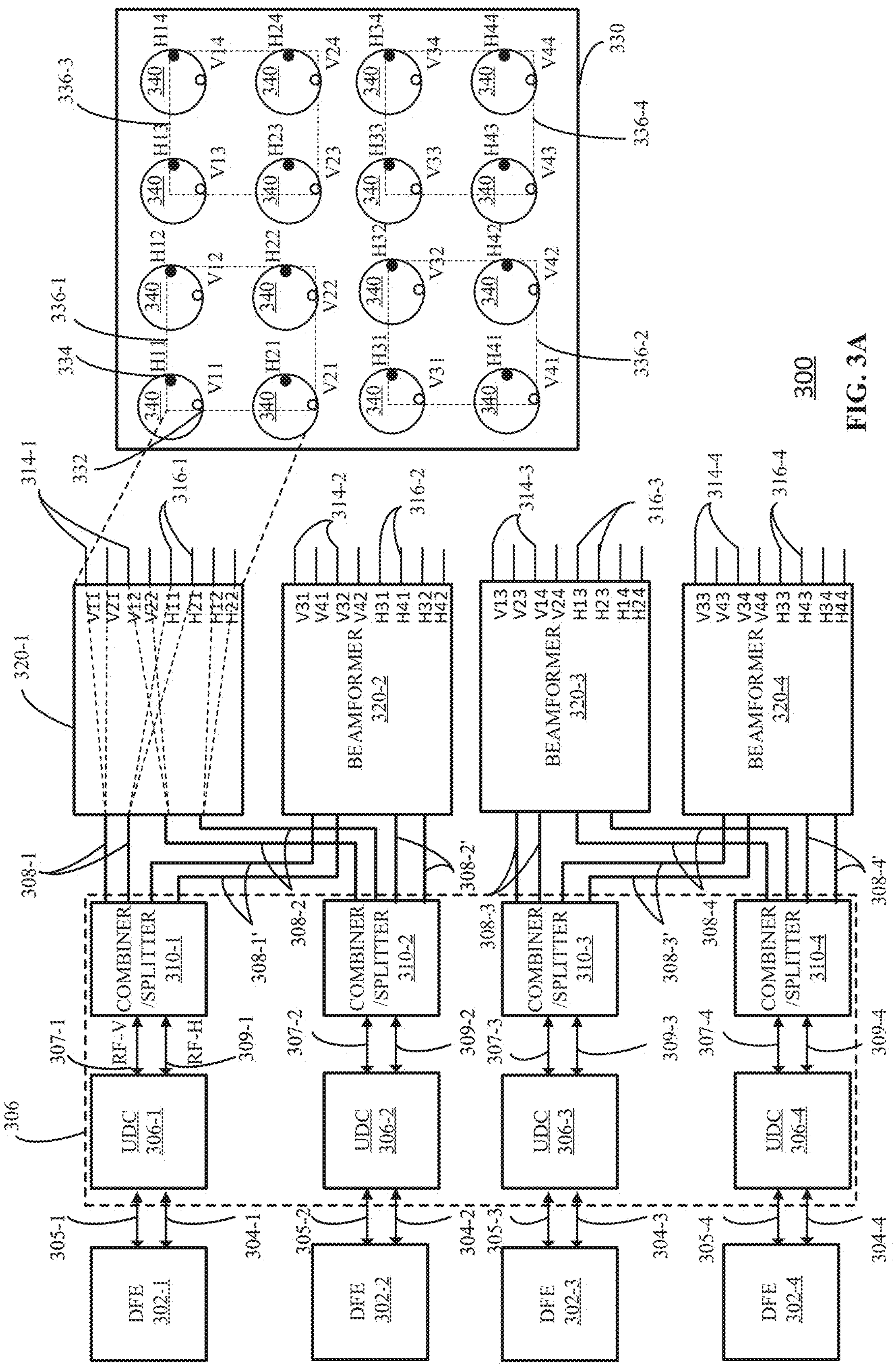
FIG. 3A shows a phased-array antenna system for column driving according to an embodiment.

FIG. 3A shows a phased-array antenna system 300 having a distributed architecture according to an embodiment. The phased-array antenna system 300 has an antenna panel which includes two or more sub-arrays 330. Each sub-array consists of sixteen dual-polarization patch antennas 340 and four beamformer devices 320-1, 320-2, 320-3, 320-4. Four DFEs 302-1, 302,-2, 302-3, 302-4 are connected via a respective horizontal polarization connections 304-1 to 304-4 and vertical polarization connection 305-1 to 305-4 to a multi-channel up-down converter UDC 306. The multichannel UDC 306 is an integrated device consisting of UDC circuits 306-1, 306-2, 306-3, 306-4 corresponding to each DFE 302. In some examples, the UDC circuits 306-1, 306-2, 306-3, 306-4 may include a PLL for local oscillator frequency generation. In other examples the local oscillator signal may be generated by external circuitry. The respective horizontal polarization connection 304 and vertical polarization connection 305 may consist of connections for I and Q signals connected to each DFE 302. Each UDC circuit 306-1, 306-2, 306-3, 306-4 is connected via connections 307-1, for vertical polarization signals and connections 309-1 for horizontal polarization signals to a respective combiner-splitter 310-1, 310-2, 310-3, 310-4. Each combiner-splitter 310 provides two signals routed to one beamformer and two signals routed to another beamformer. For example connections 308-1 connect to beamformer 320-1 and connections 308-1' connect to beamformer 320-2.

As illustrated beamformer 320-1 includes four vertical polarization beamformer channels (not shown) with connections 314-1 denoted V11, V12, V21, V22 to corresponding vertical polarization feed points 332 of a respective one of the patch antennas 340 in an antenna section 336-1. Beamformer 320-1 includes four horizontal polarization beamformer channels (not shown) having connections 316-1 denoted H11, H12, H21, H22 to corresponding horizontal polarization feed points 334 of a respective one of the patch antennas 340 in antenna section 336-1. Similarly beamformers 320-2, 320-3, 320-4 have horizontal and vertical polarization beamformer channels (not shown) similarly connected via respective connections 314-2, 314-3, 314-4, 316-2, 316-3, 316-4 to respective antenna sections 336-2, 336-3, 336-4. In phase-array antenna system 300 each RF-H, RF-V signal from the combiner-splitter 310 is coupled to two horizontal polarization feedpoints 334 or two vertical polarization feedpoints 332 via a respective beamformer 320. For example, the two connections 308-1 provide the signal for V11, V21 and the signal for H11, H21 in beamformer 320-1 and the two connections 308-1' provide the signal for V31, V41 and the signal for H31, H41 in beamformer 320-2.

As illustrated, 4 beamformers are used so one beamformer is connected to each of antenna-sections 336-1, 336-2, 336-3 and 336-4. In other examples, each beamformer may have fewer or more channels. In some examples, the patch antenna may be a single polarization antenna.

In operation, the antenna system 300 may be configured to transmit beamformed signals or to beamform received signals. The beamformers 320 may be configured in a transmit or receive mode. In a transmit mode of operation a digital signal may be converted to an analog RF signal by each DFE 302 which provide a signal for horizontal and vertical polarization to the UDC 306. The analog signals are up converted by UDC 306 and then split by combiner splitter 310 to provide a vertical polarization RF signal RF-V and a horizontal polarization RF signal RF-H for each channel. Each DFE 302 provides a signal for a respective column of the sub-array 330. For example DFE 302-1 provides signals to drive the horizontal and or vertical polarization feedpoints of the first columns of sub-array 330 (i.e. V11, V21, V31, V41 and/or H11, H21, H31, H41).

Hence the distributed architecture of phased-array antenna system 300 can support but is not limited to column driving, which is not possible with the antenna systems 100, 200.

Figure 3C:
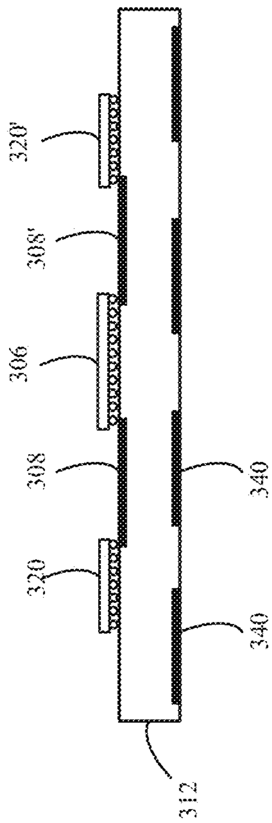
FIG. 3C shows a cross-section of the sub-array of FIG. 3B.
Figure 3D:
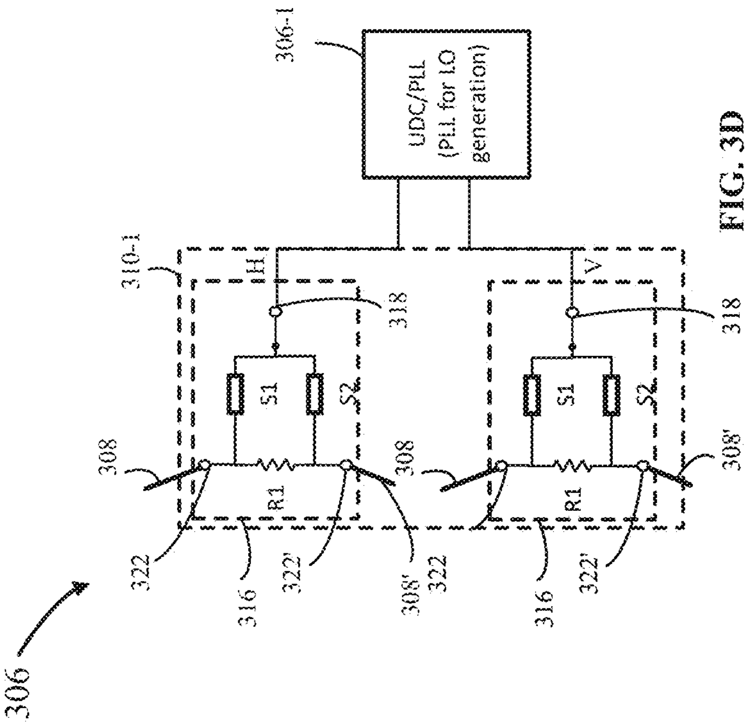
FIG. 3D shows an integrated up-down converter and input distribution network included in the sub-array of FIGS. 3A, 3B and 3C.
Figure 3B:
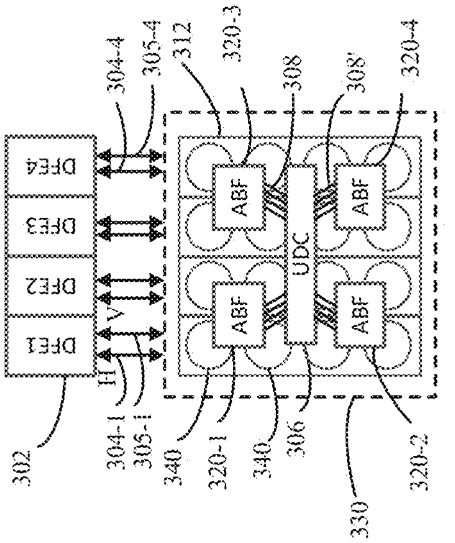
FIG. 3B shows a plan view of the physical implementation of the phased-array antenna system of FIG. 3A according to an embodiment.

FIG. 3B shows a plan view of a physical implementation of phased-array antenna system 300 having a distributed architecture according to an embodiment. Each sub-array 330 consists of sixteen patch antennas 340 of four beamformer devices 320 placed on a substrate (multi-layer printed circuit board) 312 in two rows, first row having two beamformer devices 320-1, 320-3 and second row having two beamformer devices 320-2, 320-4. Each beamformer 320 is connected to four dual-polarization antenna patches 340 as illustrated in FIG. 3A. The four DFEs 302 are coupled to the multi-channel up-down converter (UDC) 306 arranged on the substrate 312 between two rows of analog beamformers 320. Each analog beamformer 320 is also connected via connections 308, 308' to the multi-channel UDC 306.

FIG. 3C shows a cross-section of the phased-array antenna system 300. The UDC 306 is arranged on the top or first major surface as illustrated and the antennas are formed with a metal layer on the bottom or second major surface of the substrate 312. The connections 308 are shown on a top metal layer of the substrate 312. Other metal layers (not shown) may implement a ground plane, digital routing, supply connections, the antenna stripline ground and the antenna stripline signal connections.

FIG. 3D shows a detail of the integrated device 306. The UDC 306-1 is coupled to two Wilkinson networks 316 (one for each polarization) which implement a combiner-splitter 310-1. Each Wilkinson network 316 is implemented by resistor R1, and impedances S1 and S2 formed on a die. The impedance S1 is connected between a common node 318 and a respective first connection node 322. The impedance S2 is connected between the common node 318 and a respective second connection node 322'. Each common node 318 is connected to the UDC 306-1 The combiner-splitter 310-1 illustrated has a pair of connections 308, 308' to a respective beamformer 320-1, 320-2. Further Wilkinson networks (not shown) similar to the topology shown are also implemented for each further pair of connections 308, 308' for each channel of the pair of beamformers. The distributed architecture of the phased-array antenna system 300 allows the wilkinson network previously implemented on a printed circuit board (PCB) to be integrated with the UDC. This may reduce the routing complexity of the antenna panel which may increase for higher frequencies since the spacing between antenna patches reduces. The phased-array antenna system 300 maintains separate UDC and beamformer devices which allows the UDC and beamformer to be implemented in optimal technologies for each respective function. This may result in improved antenna system performance while reducing the size of the antenna panel.

Figure 4B:
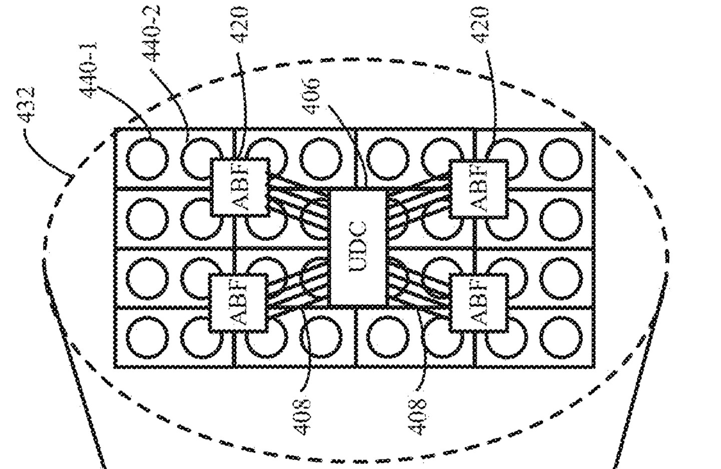
FIG. 4B shows a sub-array of the MIMO phased-array antenna system of FIG. 4A
Figure 4A:
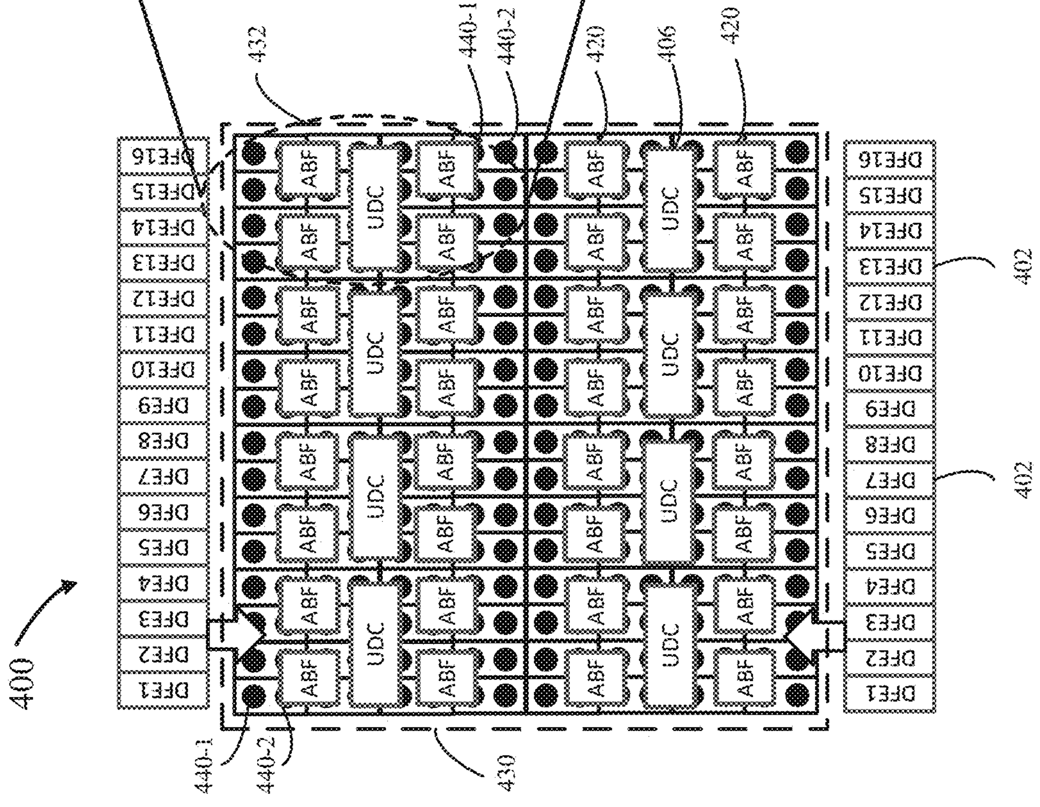
FIG. 4A, shows a multiple-input multiple-output (MIMO) phased-array antenna system for a mobile communications network according to an embodiment.

FIG. 4A shows a plan view of a MIMO antenna system 400 for a mobile communications system according to an embodiment. FIG. 4B shows an expanded view of a sub array 432 of the MIMO antenna system of 400. The MIMO antenna system 400 includes an antenna panel substrate 430 and 16 sub-arrays 432 with horizontal and vertical polarization corresponding to a total 32 RF channels. Each sub-array 432 includes four analog beamformers 420 placed on the antenna panel substrate (multi-layer printed circuit board) 430. Each beamformer 420 is connected to four pairs of dual polarization antenna patches 440-1, 440-2 and so has a total of 32 patch antennas. Four DFEs 402 are coupled to an integrated device 406 including a multi-channel UDC and combiner-splitter arranged on the substrate between two rows of analog beamformers (ABF) 420 similarly to phased-array antenna system 300. Each analog beamformer is also connected via connections 408 to the UDC in the integrated device 406. The UDC 406 may have DFE connections (not shown) which may consist of connections for I and quadrature Q signals connected to a respective DFE 402. The UDC 406 may have connections 408 for each beamformer channel in the beamformers 420. For the MIMO antenna system 400, each beamformer 420 receives four signals from the UDC 406. Similarly each beamformer 420 may have four channels (not shown) connected to a respective horizontal polarization feedpoint and four channels (not shown) connected to a respective vertical polarization feedpoint. The MIMO antenna system 400 is similar to phased-array antenna system 300 but has a pair of patch antennas coupled to each beamformer channel rather than a single patch antenna as is the case for phased-array antenna system 300. It will be appreciated that in other examples, the pair of patch antennas may be replaced by a single patch antenna.

Figure 4D:
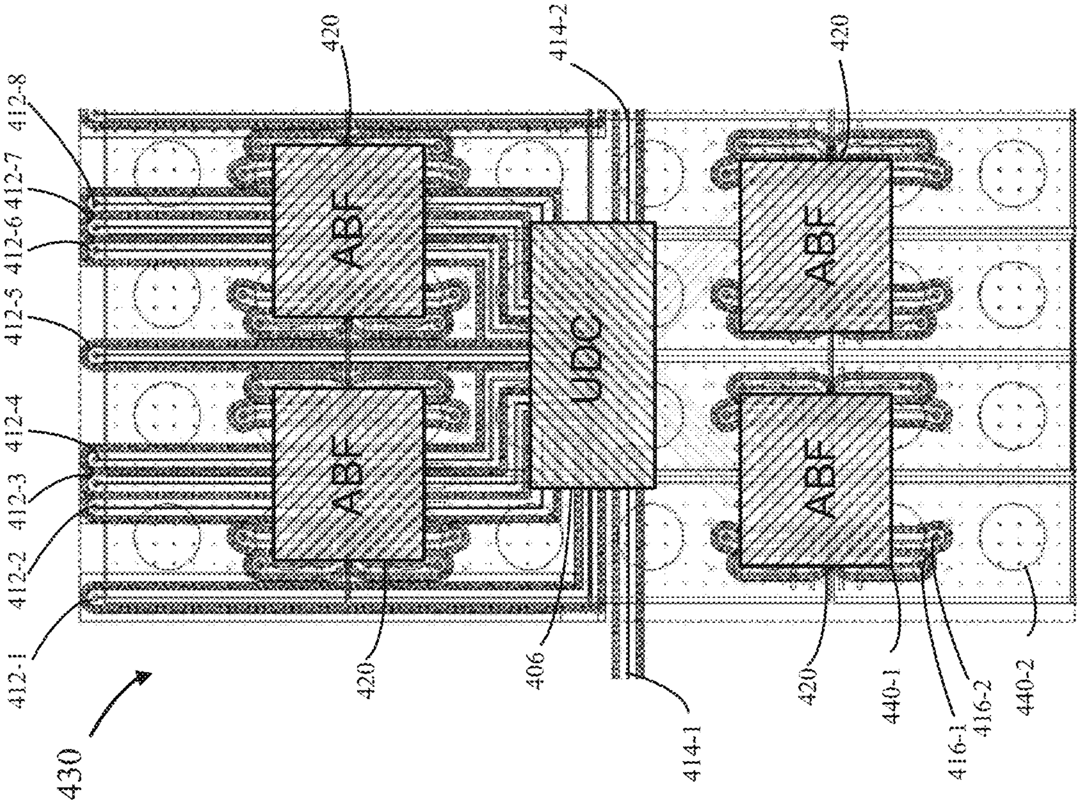
FIG. 4D shows the printed circuit board of FIG. 4C illustrating the strip line routing from the digital front end to the UDC and from the beamformers to the patch antennas.
Figure 4C:
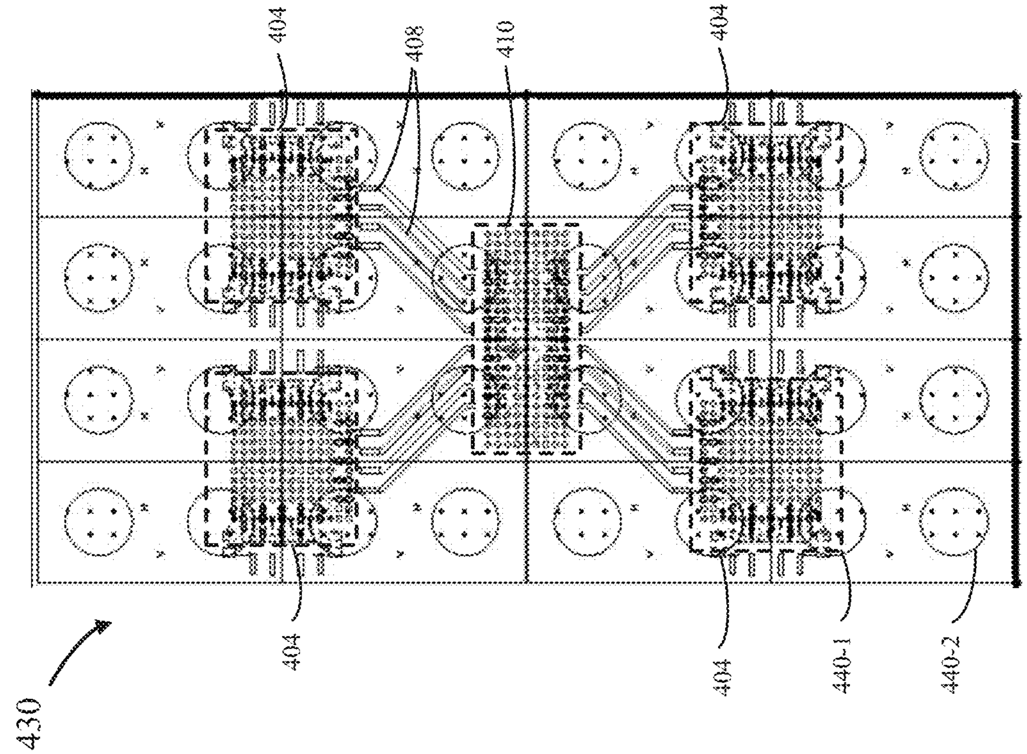
FIG. 4C shows a plan-view of a print-circuit board of the sub-array of FIG. 4B showing the routing between the beamformers and the up-down converter (UDC).

FIG. 4C shows a plan-view of a print-circuit board of the sub-array of FIG. 4B showing the routing between the beamformers 420 and the up-down converter (UDC) 406. The position of the analog beamformers is indicated in region 404 and the position of the integrated UDC is indicated by region 410.

FIG. 4D shows the printed circuit board of FIG. 4C illustrating the strip line routing from the digital front end to the UDC and from the beamformers to the patch antennas 440-1, 440-2. Strip lines 412-1, 412-2 I or Q terminals of a DFE (not shown) and a I or Q terminal of the UDC 406. Similarly terminals 412-3 to 412-8 are connected to a respective I or Q terminal of a corresponding DFE (not shown). Striplines 414-1 and 414-2 may provide the local oscillator signals to the UDC for up or down conversion and mixing. Striplines 416-1 and 416-2 may connected to a respective vertical or horizontal feedpoint of a pair of patch antennas 440-1, 440-2.

The distributed architecture of the phased-array antenna system 400 allows the wilkinson network previously implemented directly on a printed circuit board (PCB) to be integrated with the UDC an in integrated device. This may reduce the routing complexity of the antenna panel which may increase for higher frequencies, for example millimeter wave antenna arrays, since the spacing between antenna patches reduces. The phased-array antenna system 400 maintains separate UDC and beamformer devices which allows the UDC and beamformer to be implemented in optimal technologies for each respective function. This may result in improved antenna system performance while reducing the size of the antenna panel. Examples described use the Wilkinson network topology for the distribution of RF signal between the UDC and the beamformer devices. However, in other examples, it will be appreciated that the distributed architecture may allow different distribution network topologies may be implemented and integrated together with the UDC in an integrated device to reduce the routing complexity.

In some examples, the source signal provided to the UDC may be provided as a complex signal (I, Q) which may for example have frequencies including but not limited to 0, i.e. zero intermediate frequency (ZIF), a low intermediate frequency (e.g. 3 or 5 GHz), or high intermediate frequency (e.g. 11 GHz). The source signal may be an analog or digital signal, and the UDC may have an analog interface or digital (I & Q) interface. In some examples, the source signal may be a real RF signal (I+j*Q) which is provided from a digital front end by an RF DAC output connected to the UDC.

A phased-array antenna system and method of manufacturing a phased-array antenna system is described. The phased-array antenna system includes a substrate and a plurality of sub-arrays. Each sub-array comprises an array of patch antennas arranged on a first major surface of the substrate; a plurality of beamformer devices coupled to the array of patch antennas; a multi-channel up-down converter (UDC) and a combiner-splitter coupled to the multi-channel UDC. The combiner-splitter is configured to split a signal provided by the UDC and provide the signal to each of the plurality of beamformers and/or to combine signal provided by the plurality of beamformers and to provide the combined signal to the UDC. Each sub-array also includes an integrated device comprising the multi-channel UDC and the combiner-splitter. The integrated device and the plurality of beamformer devices is arranged on a second major surface of the substrate opposite the first major surface. The integrated device is arranged between at least two beamformer devices.

Embodiments of the phased-array antenna system described may be included in antenna arrays for radar systems and MIMO antenna arrays for 5G, 6G or later mobile communication systems in particular millimeter wave antenna systems. Embodiments of the phased-array antenna system described may reduce the routing complexity of a phased-array antenna system by integrating the input distribution network (combiner-splitter) and the UDC. This removes the associated disadvantages of SMD resistors i.e. the high cost, large size and parasitics which may limit high frequency of operation for example at millimeter wave frequencies.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A phased-array antenna system comprising:

a substrate having a first major surface, a second major surface opposite the first major surface, and a plurality of metal layers; and a plurality of sub-arrays coupled to the substrate, wherein a first sub-array of the plurality of sub-arrays comprises:

an array of patch antennas arranged on the first major surface of the substrate, a plurality of beamformer devices mounted on the second major surface of the substrate, wherein the plurality of beamformer devices includes at least four beamformer devices arranged in two rows of beamformer devices and two columns of beamformer devices, a first plurality of substrate connections formed from one or more of the plurality of metal layers and electrically coupled between the array of patch antennas and the plurality of beamformer devices, and an integrated device mounted on the second major surface of the substrate, wherein the integrated device is a packaged surface mount device that includes a multi-channel up-down converter, UDC, and a combiner-splitter coupled to the multi-channel UDC through at least one device connection within the integrated device, the combiner-splitter being configured to receive one or more first signals from the UDC through the at least one device connection, to split the one or more first signals provided by the UDC into a plurality of second signals, and to provide a different one of the plurality of second signals to each of the plurality of beamformers, and to receive third signals from the plurality of beamformers, to combine the third signals provided by the plurality of beamformers into a combined signal, and to provide the combined signal to the UDC through the at least one device connection, wherein the integrated device is positioned between the two rows of beamformer devices and between the two columns of beamformer devices, and the integrated device is electrically coupled to the plurality of beamformer devices in the first sub-array but not to beamformer devices in other sub-arrays of the plurality of sub-arrays.

2. The phased-array antenna system of claim 1 wherein the combiner-splitter comprises a wilkinson network.

3. The phased-array antenna system of claim 1 wherein:

the array includes an array of sixteen patch antennas;

the plurality of beamformer devices includes four beamformer devices, each beamformer device comprising four channels, each channel coupled to a respective patch antenna;

the four beamformer devices are arranged in the two rows, each row having two beamformer devices; and the integrated device is arranged between a first row and a second row of the four beamformer devices.

4. The phased-array antenna system of claim 1 wherein:

the array includes an array of thirty two patch antennas;

the plurality of beamformer devices includes four beamformer devices, each beamformer device comprising four channels, each channel coupled to a respective pair of patch antennas;

the four beamformer devices are arranged in the two rows each row having two beamformer devices; and the integrated device is arranged between a first row of the two rows and a second row of the two rows.

5. The phased-array antenna system of claim 1 further comprising a plurality of digital front-ends, DFEs, each digital front-end configured to provide a signal for each channel of the multi-channel UDC.

6. The phased-array antenna system of claim 1, wherein each sub-array further comprises:

a second plurality of substrate connections between the multi-channel UDC and the plurality of beamformers, the second plurality of connections comprising a first metal layer of the plurality of the metal layers, and wherein the first plurality of substrate connections between the plurality of beamformers and the array of patch antennas comprise at least a second metal layer of the plurality of the metal layers.

7. The phased-array antenna system of claim 5 wherein each sub-array further comprises:

a second plurality of substrate connections between the multi-channel UDC and the plurality of beamformers, the second plurality of connections comprising a first metal layer of the plurality of the metal layers, wherein the first plurality of substrate connections between the plurality of beamformers and the array of patch antennas comprise at least a second metal layer of the plurality of the metal layers; and a third plurality of connections between the multi-channel UDC and the plurality of DFEs, the third plurality of connections comprising the first metal layer of the plurality of the metal layers.

8. The phased-array antenna system of claim 1 configured as a millimeter wave antenna system.

9. A multiple-input multiple-output, MIMO, antenna system for a mobile communication system comprising the phased-array antenna system of claim 1.

10. A radar system comprising the phased-array antenna system of claim 1.

11. The phased-array antenna system of claim 2 wherein:

the array includes an array of sixteen patch antennas;

the plurality of beamformer devices includes four beamformer devices, each beamformer device comprising four channels, each channel coupled to a respective patch antenna;

the four beamformer devices are arranged in the two rows each row having two beamformer devices; and the integrated device is arranged between a first row and a second row of the four beamformer devices.

12. The phased-array antenna system of claim 2 wherein:

the array includes an array of thirty two patch antennas;

the plurality of beamformer devices includes four beamformer devices, each beamformer device comprising four channels, each channel coupled to a respective pair of patch antennas;

the four beamformer devices are arranged in the two rows each row having two beamformer devices; and the integrated device is arranged between a first row of the two rows and a second row of the two rows.

13. The phased-array antenna system of claim 3 further comprising a plurality of digital front-ends, DFEs, each digital front-end configured to provide a signal for each channel of the multi-channel UDC.

14. A method of manufacturing a phased-array antenna system, the method comprising:

providing a substrate having a first major surface, a second major surface opposite the first major surface, and a plurality of metal layers; and forming a plurality of sub-arrays on the substrate, wherein a first sub-array of the plurality of sub-arrays is formed by:

forming an array of patch antennas on the first major surface of the substrate, physically coupling a plurality of beamformer devices to the second major surface of the substrate, while electrically coupling the plurality of beamformer devices to the array of patch antennas through a first plurality of substrate connections formed from one or more of the plurality of metal layers, wherein the plurality of beamformer devices includes at least four beamformer devices arranged in two rows of beamformer devices and two columns of beamformer devices, and physically coupling an integrated device to the second major surface of the substrate, wherein the integrated device is a packaged surface mount device, and the integrated device includes:

a multi-channel up-down converter, UDC, and a combiner-splitter coupled to the multi-channel UDC through at least one device connection within the integrated device, the combiner-splitter being configured to receive the one or more first signals from the UDC through the at least one device connection, to split the one or more first signals provided by the UDC into a plurality of second signals, and to provide a different one of the plurality of second signals to each of the plurality of beamformers, and to receive third signals from the plurality of beamformers, to combine the third signals provided by the plurality of beamformers into a combined signal, and to provide the combined signal to the UDC through the at least one device connection, wherein the integrated device is positioned between the two rows of beamformer devices and between the two columns of beamformer devices, and the integrated device is electrically coupled to the plurality of beamformer devices in the first sub-array but not to beamformer devices in other sub-arrays of the plurality of sub-arrays.

15. The method of claim 14 wherein the combiner-splitter comprises a wilkinson network.

16. The method of claim 14 wherein:

the array includes an array of sixteen patch antennas;

the plurality of beamformer devices includes four beamformer devices, each beamformer device comprising four channels, each channel coupled to a respective patch antenna;

the four beamformer devices are arranged in the two rows each row having two beamformer devices; and the integrated device is arranged between a first row and a second row.

17. The method of claim 14 wherein:

the array includes an array of thirty two patch antennas;

the plurality of beamformer devices includes four beamformer devices, each beamformer device comprising four channels, each channel coupled to a respective pair of patch antennas;

the four beamformer devices are arranged in the two rows each row having two beamformer devices; and the integrated device is arranged between the first row and the second row.

* * * * *